US008002618B1

(12) United States Patent
Lockton et al.

(10) Patent No.: US 8,002,618 B1
(45) Date of Patent: Aug. 23, 2011

(54) METHOD OF AND SYSTEM FOR CONDUCTING MULTIPLE CONTESTS OF SKILL WITH A SINGLE PERFORMANCE

(75) Inventors: David B. Lockton, Carmel, CA (US);
Mark K. Berner, Santa Clara, CA (US);
Mark J. Micheli, San Francisco, CA (US)

(73) Assignee: Winview, Inc., Carmel, CA (US)

( * ) Notice: Subject to any disclaimer, the term of this patent is extended or adjusted under 35 U.S.C. 154(b) by 1011 days.

(21) Appl. No.: 11/652,240

(22) Filed: Jan. 10, 2007

Related U.S. Application Data

(60) Provisional application No. 60/757,960, filed on Jan. 10, 2006.

(51) Int. Cl.
*G06F 17/00* (2006.01)
(52) U.S. Cl. .......................................................... 463/9
(58) Field of Classification Search .................. 463/5, 9, 463/16, 42
See application file for complete search history.

(56) References Cited

U.S. PATENT DOCUMENTS

| | | | |
|---|---|---|---|
| 4,141,548 A | 2/1979 | Everton | |
| 4,496,148 A | 1/1985 | Morstain et al. | |
| 4,592,546 A | 6/1986 | Fascenda et al. | 273/1 |
| 4,816,904 A | 3/1989 | McKenna et al. | 179/15 BS |
| 5,013,038 A | 5/1991 | Luxenberg et al. | 273/439 |
| 5,035,422 A | 7/1991 | Berman | 273/439 |
| 5,073,931 A | 12/1991 | Audebert et al. | 380/23 |
| 5,083,271 A | 1/1992 | Thacher et al. | 364/411 |
| 5,083,800 A | 1/1992 | Lockton | 273/439 |
| 5,120,076 A | 6/1992 | Luxenberg et al. | 273/439 |
| 5,213,337 A | 5/1993 | Sherman | 273/439 |
| 5,227,874 A | 7/1993 | Von Kohorn | 358/84 |
| 5,263,723 A | 11/1993 | Pearson et al. | 273/439 |
| 5,283,734 A | 2/1994 | Von Kohorn | 364/412 |
| 5,343,236 A | 8/1994 | Koppe et al. | 348/6 |
| 5,343,239 A | 8/1994 | Lappington et al. | 348/12 |

(Continued)

FOREIGN PATENT DOCUMENTS

CA 2252021 11/1998

(Continued)

OTHER PUBLICATIONS

"Two Way TV Patent and Filing Map", www.twowaytv.com/version4/technologies/tech_patents.asp.
"Ark 4.0 standard edition, Technical Overview," www.twowaytv.com/version4/technologies/tech_ark_professional.asp.
"Understanding the Interactivity Between Television and Mobile Commerce", Robert Davis and David Yung, Communications of the ACM, Jul. 2005, vol. 48, No. 7, pp. 103-105.

(Continued)

*Primary Examiner* — Ronald Laneau
(74) *Attorney, Agent, or Firm* — Haverstock & Owens LLP

(57) ABSTRACT

A method of and system for conducting multiple competitions of skill for a single performance are described herein. User generated competition groups and system generated competition groups allow users to participate in multiple competitions at once based on answering the same questions or making the same selections related to a single event. The users are informed of each competition either via email, text message or when logging into the network via a website. The users select which competitions groups to join. After joining the desired groups, the users then make their selections related to the event which are transmitted to the network where results are tabulated and transmitted back to the users. The results are separated based on each competition group, so that users can continually know where they stand in each separate competition. With multiple competition groups, users are able to have varying success from the same performance in multiple competitions.

44 Claims, 3 Drawing Sheets

U.S. PATENT DOCUMENTS

| | | | | |
|---|---|---|---|---|
| 5,462,275 | A | 10/1995 | Lowe et al. | 273/94 |
| 5,479,492 | A | 12/1995 | Hofstee et al. | 379/92 |
| 5,553,120 | A | 9/1996 | Katz | |
| 5,586,257 | A | 12/1996 | Perlman | 463/42 |
| 5,589,765 | A | 12/1996 | Ohmart et al. | |
| 5,643,088 | A | 7/1997 | Vaughn et al. | 463/40 |
| 5,762,552 | A | 6/1998 | Vuong et al. | 463/25 |
| 5,764,275 | A | 6/1998 | Lappington et al. | 348/12 |
| 5,813,913 | A | 9/1998 | Berner et al. | 463/40 |
| 5,838,774 | A | 11/1998 | Weisser, Jr. | 379/92.02 |
| 5,860,862 | A | 1/1999 | Junkin | 463/40 |
| 5,870,683 | A | 2/1999 | Wells et al. | |
| 5,916,024 | A | 6/1999 | Von Kohorn | |
| 5,970,143 | A | 10/1999 | Schneier et al. | 380/23 |
| 5,971,854 | A | 10/1999 | Pearson et al. | 463/41 |
| 5,987,440 | A | 11/1999 | O'Neil et al. | 705/44 |
| 6,016,337 | A | 1/2000 | Pykalisto | 379/92.02 |
| 6,117,013 | A | 9/2000 | Eiba | |
| 6,126,543 | A * | 10/2000 | Friedman | 463/16 |
| 6,174,237 | B1 | 1/2001 | Stephenson | 463/42 |
| 6,182,084 | B1 | 1/2001 | Cockrell et al. | 707/104 |
| 6,193,610 | B1 | 2/2001 | Junkin | 463/40 |
| 6,293,868 | B1 | 9/2001 | Bernard | |
| 6,416,414 | B1 | 7/2002 | Stadelmann | |
| 6,425,828 | B2 | 7/2002 | Walker et al. | 463/42 |
| 6,434,398 | B1 | 8/2002 | Inselberg | |
| 6,524,189 | B1 | 2/2003 | Rautila | |
| 6,578,068 | B1 | 6/2003 | Bowman-Amuah | 709/203 |
| 6,604,997 | B2 | 8/2003 | Saidakovsky et al. | 463/9 |
| 6,610,953 | B1 | 8/2003 | Tao et al. | |
| 6,648,760 | B1 | 11/2003 | Nicastro | 463/23 |
| 6,659,872 | B1 | 12/2003 | Kaufman et al. | |
| 6,690,661 | B1 | 2/2004 | Agarwal et al. | |
| 6,718,350 | B1 | 4/2004 | Karbowski | |
| 6,752,396 | B2 | 6/2004 | Smith | |
| 6,758,754 | B1 | 7/2004 | Lavanchy et al. | 463/42 |
| 6,760,595 | B2 | 7/2004 | Inselberg | 455/517 |
| 6,763,377 | B1 | 7/2004 | Belknap et al. | 709/223 |
| 6,774,926 | B1 | 8/2004 | Ellis et al. | |
| 6,785,561 | B1 | 8/2004 | Kim | |
| 6,807,675 | B1 | 10/2004 | Maillard et al. | 725/35 |
| 6,817,947 | B2 | 11/2004 | Tanskanen | 463/41 |
| 6,824,469 | B2 | 11/2004 | Allibhoy et al. | 463/40 |
| 6,840,861 | B2 | 1/2005 | Jordan et al. | 463/42 |
| 6,846,239 | B2 | 1/2005 | Washio | |
| 6,857,122 | B1 | 2/2005 | Takeda et al. | |
| 6,863,610 | B2 | 3/2005 | Vancraeynest | 463/41 |
| 6,871,226 | B1 | 3/2005 | Ensley et al. | |
| 6,884,172 | B1 | 4/2005 | Lloyd et al. | |
| 6,887,159 | B2 | 5/2005 | Leen et al. | 463/42 |
| 6,893,347 | B1 | 5/2005 | Zilliacus et al. | |
| 6,942,574 | B1 | 9/2005 | LeMay et al. | 463/41 |
| 6,960,088 | B1 | 11/2005 | Long | |
| 7,035,653 | B2 | 4/2006 | Simon et al. | |
| 7,194,758 | B1 | 3/2007 | Waki et al. | |
| 7,254,605 | B1 | 8/2007 | Strum | 709/203 |
| 7,347,781 | B2 | 3/2008 | Schultz | |
| 7,351,149 | B1 | 4/2008 | Simon et al. | |
| 7,379,705 | B1 | 5/2008 | Rados et al. | |
| 2001/0004609 | A1 | 6/2001 | Walker et al. | |
| 2001/0005670 | A1 | 6/2001 | Lahtinen | |
| 2001/0020298 | A1 | 9/2001 | Rector, Jr. et al. | |
| 2002/0010789 | A1 | 1/2002 | Lord | |
| 2002/0042293 | A1 | 4/2002 | Ubale et al. | |
| 2002/0054088 | A1 | 5/2002 | Tanskanen et al. | 345/744 |
| 2002/0056089 | A1 | 5/2002 | Houston | 725/9 |
| 2002/0078176 | A1 | 6/2002 | Nomura et al. | |
| 2002/0108125 | A1 | 8/2002 | Joao | |
| 2002/0108127 | A1 | 8/2002 | Lew et al. | |
| 2002/0124247 | A1 | 9/2002 | Houghton | 725/9 |
| 2002/0157002 | A1 | 10/2002 | Messerges et al. | |
| 2002/0159576 | A1 | 10/2002 | Adams | |
| 2002/0162031 | A1 | 10/2002 | Levin et al. | |
| 2002/0177483 | A1 * | 11/2002 | Cannon | 463/42 |
| 2003/0013528 | A1 | 1/2003 | Allibhoy et al. | |
| 2003/0040363 | A1 * | 2/2003 | Sandberg | 463/42 |
| 2003/0069828 | A1 | 4/2003 | Blazey et al. | 705/37 |
| 2003/0070174 | A1 | 4/2003 | Solomon | |
| 2003/0144017 | A1 | 7/2003 | Inselberg | 455/517 |
| 2003/0154242 | A1 | 8/2003 | Hayes et al. | 709/203 |
| 2003/0177504 | A1 | 9/2003 | Paulo et al. | |
| 2003/0216185 | A1 | 11/2003 | Varley | |
| 2004/0014524 | A1 | 1/2004 | Pearlman | |
| 2004/0022366 | A1 | 2/2004 | Ferguson et al. | |
| 2004/0088729 | A1 | 5/2004 | Petrovic et al. | |
| 2004/0093302 | A1 | 5/2004 | Baker et al. | 705/37 |
| 2004/0117839 | A1 | 6/2004 | Watson et al. | 725/87 |
| 2004/0148638 | A1 | 7/2004 | Weisman et al. | |
| 2004/0152454 | A1 | 8/2004 | Kauppinen | |
| 2004/0158855 | A1 | 8/2004 | Gu et al. | 725/39 |
| 2004/0178923 | A1 | 9/2004 | Kuang | 340/825.72 |
| 2004/0198495 | A1 | 10/2004 | Cisneros et al. | 463/24 |
| 2004/0203667 | A1 | 10/2004 | Schroder et al. | |
| 2004/0203898 | A1 | 10/2004 | Bodin et al. | |
| 2004/0224750 | A1 | 11/2004 | Al-Ziyoud | |
| 2005/0026699 | A1 | 2/2005 | Kinzer et al. | |
| 2005/0060219 | A1 | 3/2005 | Deitering et al. | |
| 2005/0076371 | A1 | 4/2005 | Nakamura | 725/75 |
| 2005/0097599 | A1 | 5/2005 | Plotnick et al. | |
| 2005/0101309 | A1 | 5/2005 | Croome | |
| 2005/0113164 | A1 | 5/2005 | Buecheler et al. | |
| 2005/0131984 | A1 | 6/2005 | Hofmann et al. | |
| 2005/0235043 | A1 | 10/2005 | Teodosiu et al. | |
| 2005/0255901 | A1 | 11/2005 | Kreutzer | |
| 2005/0273804 | A1 | 12/2005 | Preisman | |
| 2005/0288812 | A1 | 12/2005 | Cheng et al. | |
| 2006/0025070 | A1 | 2/2006 | Kim et al. | |
| 2006/0047772 | A1 | 3/2006 | Crutcher | |
| 2006/0059161 | A1 | 3/2006 | Millett et al. | 707/10 |
| 2006/0089199 | A1 | 4/2006 | Jordan et al. | |
| 2006/0148569 | A1 | 7/2006 | Beck | |
| 2006/0174307 | A1 | 8/2006 | Hwang et al. | |
| 2006/0205483 | A1 * | 9/2006 | Meyer et al. | 463/25 |
| 2006/0269120 | A1 | 11/2006 | Nehmadi et al. | |
| 2007/0004516 | A1 | 1/2007 | Jordan et al. | |
| 2007/0226062 | A1 * | 9/2007 | Hughes et al. | 705/14 |
| 2007/0243936 | A1 * | 10/2007 | Binenstock et al. | 463/42 |
| 2008/0076497 | A1 * | 3/2008 | Kiskis et al. | 463/9 |
| 2009/0234674 | A1 | 9/2009 | Wurster | |

FOREIGN PATENT DOCUMENTS

| | | |
|---|---|---|
| CA | 2252074 | 11/1998 |
| CA | 2279069 | 7/1999 |
| CA | 2287617 | 10/1999 |
| EP | 0 649 102 A3 | 6/1996 |
| JP | 1-46356 | 2/1999 |
| JP | 11-239183 | 8/1999 |
| JP | 2000-165840 | 6/2000 |
| JP | 2000-209563 | 7/2000 |
| JP | 2000-217094 | 8/2000 |
| JP | 2000-358255 | 12/2000 |
| JP | 2001-28743 | 1/2001 |
| NZ | 330242 | 10/1998 |
| WO | WO 01/65743 A1 | 9/2001 |

OTHER PUBLICATIONS

"Re: Multicast Based Voting System," www.ripe.net/ripe/maillists/archives/mbone-eu-op/1997/msg00100html.

"IST and Sportal.com: Live on the Internet Sep. 14, 2004 by Clare Spoonheim", www.isk.co.usk/NEWS/dotcom/ist_sportal.html.

"Modelling User Behaviour in Networked Games by Tristan Henderson and Saleem Bhatti", www.woodworm.cs.uml.edu/rprice/ep/henderson.

"SMS Based Voting and Survey System for Meetings", WWW.abbit.be/technology/SMSSURVEY.htm.

"PurpleAce Launches 3GSM Ringtone Competition", www.wirelessdevnet.com/news/2005/jan/31/news6html.

"On the Performance of Protocols for Collecting Responses over a Multiple-Access Channel", Mostafa H. Ammar and George N. Rouskas, IEEE INFOCOM '91, pp. 1490-1499, vol. 3, IEEE, New York, NY.

Meriam-Webster, "Game" definition, <http://www.merriam-webster.com/dictionary/agme>p. 1.

* cited by examiner

METHOD OF AND SYSTEM FOR CONDUCTING MULTIPLE CONTESTS OF SKILL WITH A SINGLE PERFORMANCE

RELATED APPLICATION(S)

This Patent Application claims priority under 35 U.S.C. §119(e) of the co-pending, co-owned U.S. Provisional Patent Application No. 60/757,960, filed Jan. 10, 2006, and entitled "METHODOLOGY FOR CONDUCTING MULTIPLE CONTESTS OF SKILL WITH A SINGLE PERFORMANCE" which is also hereby incorporated by reference in its entirety.

FIELD OF THE INVENTION

The present invention relates to the field of distributed gaming. More specifically, the present invention relates to the field of distributed gaming utilizing a mobile device.

BACKGROUND OF THE INVENTION

In the United States alone there are over 170 million registered cellular phones. With the expiration of the U.S. Pat. No. 4,592,546 to Fascenda and Lockton, companies are able to now use the cellular phone and other mobile communication devices utilizing a multicast network to control television viewers in games of skill based upon predicting, for example, what the quarterback may call on the next play, within a football game. In addition, games of skill with a common start time can be conducted simultaneously among cellular phone owners, based on classic card, dice, trivia, and other games. In order to avoid the anti-gaming laws in the various states, the winners must be determined by the relative skill, experience and practice of the player in each discrete game.

U.S. Pat. No. 5,813,913 ('913) to Berner and Lockton provides for a central computing system which includes a means of grouping participants having similar skill levels together in simultaneous, but separate, levels of competition playing an identical game. The relative performances are communicated to only those participants competing at the same skill level. The '913 patent also provides for a wireless receiving device to permanently store the specific skill level for each participant for each type of common event such as those based on televised sports or game shows. The '913 patent provides for a telephonic link at the completion of the game to collect information and update the skill level of the participants of a particular game. When a person achieves sufficient points or meets other objective criteria to graduate into another skill level, a method is provided for accomplishing this in the central computer and then transmitting an alert to the participant notifying them of their promotion. The '913 patent describes awarding prizes and providing recognition for the members of each discreet skill level in a common game. All users, no matter what level they are on, receive the same number of questions and thus the possibility of earning the same number of points. Thus direct comparisons between users at different levels, although not encouraged are possible. Such comparisons between players of disparate skills can lead to user discouragement.

Games of skill and chance have an intrinsic excitement and entertainment value. Any game is greatly enhanced by a participant's ability to know how their performance compares in relation to other participants and/or to historical performance for the game throughout the contest. As with any game of skill, competition among friends, or with strangers of similar experience, or the ability at ones option, sometimes for an extra consideration, to compete in a separate team or individual contest, offers the opportunity of increased enjoyment and prizes.

SUMMARY OF THE INVENTION

A method of and system for conducting multiple competitions of skill for a single performance are described herein. User generated competition groups and system generated competition groups allow users to participate in multiple competitions at once based on answering the same questions or making the same selections related to a single event. The users are informed of the availability of each competition either via email, text message or when logging into the network via a website. The users select which competitions groups to join. After joining the desired groups, the users then make their selections related to the event which are transmitted to the network where results are tabulated and transmitted back to the users. The results are separated for each competition group, so that users continually know where they stand in each separate competition. With multiple competition groups, users are able to have varying success from the same performance in multiple competitions.

In one aspect, a method of participating in multiple contests of skill corresponding to an event comprises receiving a list of competitive groups to join, selecting a plurality of competitive groups to join, participating with the plurality of competitive groups by sending selections related to the single event to a server and receiving standings on a device from the server, wherein the standings are based on results from the selections. The event is selected from the group consisting of a television-based sporting event, entertainment programming and a game show. Alternatively, the event comprises identical classic card, dice, trivia and word games played simultaneously. Receiving the standings on the device with the plurality of competitive groups occurs during the event. The results are separated based on the plurality of competitive groups. The standings are received periodically and represent performance in the competitive groups. The competitive groups are selected from the service provider generated competitive groups and/or user generated competitive groups. The service provider generated competitive groups are based on general playing characteristics. The list of competitive groups to join is received on the device selected from the user interface including a cellular phone, a laptop computer, a personal computer or a PDA. The competitive groups are maintained in a database. In some embodiments, the results include a handicap.

In another aspect, a method of conducting multiple contests of skill corresponding to an event comprises generating separate competitive groups related to the event, coupling to a network to participate in the competitive groups, informing a user which of the competitive groups are available for the user to join, joining a selected number of the competitive groups, participating with the competitive groups by sending selections related to the event to a server within the network, storing results and standings on the server, wherein the standings are based on the results and the results are based on the selections and transmitting the standings to a device. The method further comprises displaying the standings on the device. The server contains an application and a database for assisting in generating the competitive group. The application includes a graphical user interface. The device contains an application for assisting in generating the competitive group. Generating competitive groups related to the event further comprises coupling to the server, selecting a type of contest and additional conditions to be included in the competitive group, adding competitors to the competitive group and selecting the event for competition by the competitive group. The type of contest is selected from the group consisting of, for example, an open contest, a head-to-head contest and a team contest. Adding competitors to the competitive group includes identifying the competitors by an identifier selected from the group consisting of a username, an email address, a cellular phone number or other unique identifier. The method further comprises sending an invitation which informs the competitors of an opportunity to be included in the competitive group. The invitation is sent by a competitor or the service provider with a mechanism selected from the group consisting of an email, an SMS text message, a voice message or similar addressable communication. The event is selected from the group consisting of, for example, a television-based sporting event, entertainment programming and a game show. Alternatively, the event comprises identical classic card, dice, trivia and word games played simultaneously. Transmitting the standings with the competitive groups occurs during the event. The standings are separated for each of the competitive groups. The standings are received periodically and represent performance in the competitive groups. The competitive groups are selected from the service provider generated competitive groups and/or user generated competitive groups. The service provider generated competitive groups are based on general playing characteristics. The device is selected from the group consisting of a cellular phone, a laptop computer, a personal computer and a PDA. The competitive groups are maintained in a database. In some embodiments, the results include a handicap.

In another embodiment, a system for conducting multiple contests of skill corresponding to an event comprises a device and a server coupled to the device through a network for storing competitive groups, receiving selections related to the event, storing results and standings based on the selections and transmitting the standings to the device. The server is further for providing an interface for generating competitive groups related to the event. The device contains an application for generating the competitive groups related to the event. The event is selected from the group consisting of a television-based sporting event, entertainment programming and a game show. Alternatively, the event comprises classic card, dice, trivia and word games played simultaneously. The device communicates data for generating the competitive groups, for selecting the competitive groups to join and for submitting the selections. The network includes at least one of the Internet and a cellular network. The standings are transmitted periodically to the device and represent performance in the competitive groups. The standings are separated for each of the competitive groups. The network identifies the competitive groups a user is eligible for. The system further comprises a database stored on the server for managing the selections, the results, the standings and the competitive groups. The device is selected from the group consisting of a cellular phone, a laptop computer, a personal computer and a PDA. In some embodiments, the results include a handicap.

In yet another aspect, a network of devices for conducting multiple contests of skill corresponding to an event comprises a plurality of devices and a server within a network, wherein the server and the plurality of devices communicate to conduct the multiple contests of skill corresponding to the event. The plurality of devices are selected from the group consisting of cellular phones, laptop computers, personal computers and PDAs.

In another aspect, a server device for conducting multiple contests of skill corresponding to an event comprises a storage mechanism and an application for interacting with the storage mechanism and a communicating device to generate and store competitive groups which are used to compete in the multiple contests of skill. The storage mechanism is a database. The communicating device is selected from the group consisting of a cellular phone, a laptop computer, a personal computer and a PDA. Interacting with the storage mechanism and the communicating device further includes receiving selections and transmitting standings.

In yet another aspect, a device for participating in multiple contests of skill corresponding to a single event comprises a communications module for coupling to a server and an application for utilizing the communications module for coupling to a server to communicate with the server to generate competitive groups which are used to compete in the multiple contests of skill. The application utilizes the communications module for coupling to the server to send selections to and receive standings from the server.

In yet another aspect, a device for participating in multiple simultaneous contests of skill corresponding to a single event comprises a storage module and an application stored within the storage module for simultaneously starting the multiple contests of skill and simultaneously scoring the multiple contests of skill. The application is downloaded from a server.

DETAILED DESCRIPTION OF THE PREFERRED EMBODIMENT

Figure 1:
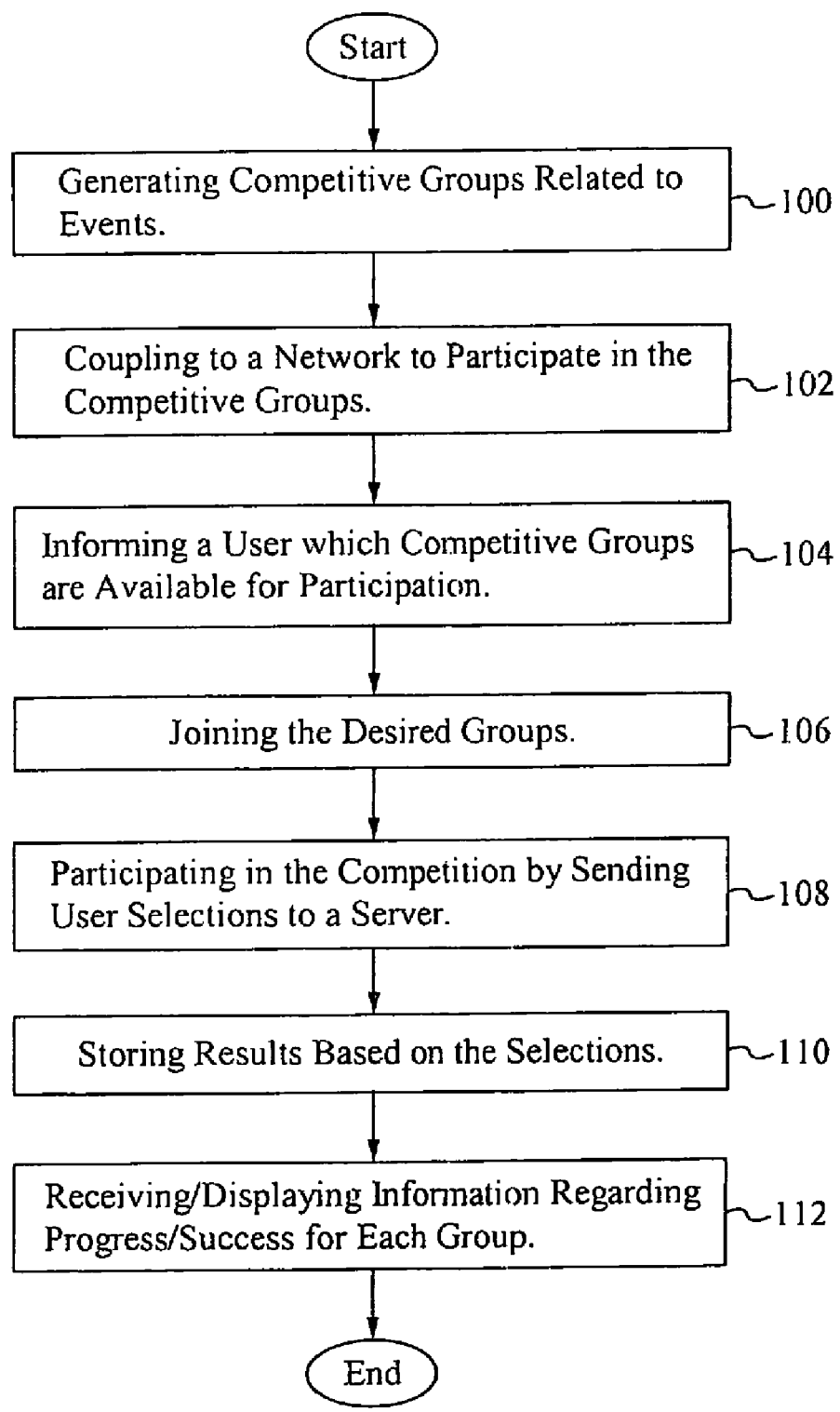
FIG. 1 illustrates a flowchart of a process of utilizing the present invention.

A method and system for conducting a variety of competitions simultaneously are described herein. The organization of competition in a game of skill has previously taken one of three basic formats:

1) Open contests: where large numbers of players enter an event, and all of the entrants are competing against each other for a single prize pool.

2) Head-to-head: where competitors are matched between a relatively small number of players identified to compete head-to-head against each other. The actual match making occurs in many forms, such as match play or elimination tournaments.

3) Team competitions: where two or more people are teamed to compete in head-to-head elimination against other similar sized teams in match play or total score competitions.

The present invention is a system and method allowing participants to simultaneously compete in multiple contests based on a single performance. For example, a user is able to participate in an open contest, compete in a team competition, and also compete against a small group of friends all utilizing a score achieved in the same event.

As a comparison, in tournaments held for bowling or golf, players are able to compete simultaneously in a gross score tournament as well as a net (handicap) tournament with the same performance. However, the contestants in the gross and net competitions are identical. The focus of the present invention is on enabling the entry of an individual in separate competitions, with separate prizes based on their single performance (score), where the pool of entrants is different for each competition.

The default mechanism for organizing a competition for this type of game in the past has been an open contest where all competitors are automatically entered in a contest against all other players. As taught in U.S. Pat. No. 5,813,913, incorporated herein by reference, the competitive field of players is also able to be divided into separate flights or groups according to skill and experience and only scores from other competitions at the same skill level are compared. Thousands of players are able to compete in a particular football game within a particular skill level.

For this example, Player A has been rated as an "intermediate" player and is competing against 10,000 other "intermediate" players in an interactive game of skill played with a live Monday Night Football broadcast. Prior to the telecast, Player A has arranged a side competition against four of his friends. Player B has organized through a match-making interface, a small competition which includes Players A, B, C, D and E. In this example, Players A and B are intermediate players, but Players C, D and E are novice players. Player B has also organized this small competition to require a $2.00 entry fee with a winner-takes-all rule. While none of the competitions require prizes or awards, they are allowable in games of skill.

When Player A logs on to a network supporting mobile games of skill, he is presented with the option of competing in the private separate contest that Player B set up. Player A agrees to compete with the $2.00 entry fee.

Separately, Player A has previously registered to participate in a sponsored season long team competition with coworkers F, G and H. The highest two scores of their four man team are totaled, and these points are added to the season's cumulative score with the highest team scores winning prizes. Thus, for a single football game, Player A is registered in: an open competition where the best competitors win prizes, a friendly competition for a prize pool of $10, and a season long team competition.

During the football game, Player A, like all of the other players, tries to get the best possible score by predicting the plays correctly before they happen. He plays in the same manner he would playing in the open contest alone, but his performance is in fact simultaneously separately scored in these completely different competitions against a different set of opponents for different rewards.

At the end of the event, Player A scored 12,565 points, in this example. That score was in the $92^{nd}$ percentile among the 10,000 intermediate players, but not high enough to win an award in that contest. That same score of 12,565 was also compared against Players B, C, D and E, and was the highest score, so Player A won the separate competition of $10. At the same time, Player A's score was the second highest among his team members in the separate team competition, and therefore was one which was totaled for the season long team competition.

It is essential to the success and enjoyment of such an invention that a potential competitor have an easy method of registering and entering these separate competitions on an ad hoc or seasonal basis. In addition, it is important to the success of such a system that all of the competitors be able to monitor periodically, not only their ongoing standings in the overall open competition at their skill level, but they will be able to periodically review all the competitions they are entered into to see the current standings.

For each of these competitions, there are two ways the group of attendees are able to be formed: A) organized by the service provider and/or a commercial sponsor or B) organized by the users themselves. Examples of service provider generated groups include those based on competitive skill level and region. For example, all intermediate players for a specific football game. An example of a user generated group is identifying five friends for a football competition. As each player enters a particular event (e.g. Monday Night Football), they are informed of the competitions they are playing in (e.g. Intermediate Global competition, the California Bay Area competition, and the personal Group competition). Each group is able to have a generic name and/or a specific name such as "personal group competition 1" or "Bob's Competition." When a player's phone or computing device establishes a connection with the network (e.g. the Airplay Network), the network identifies all of the groups that this player is able to compete in, and the server will upload this information to the phone over a cellular connection for display to the user. When a user couples to the network with a computing device other than a cellular phone, the information is available through the Internet. In some embodiments, participation in various group competitions involves additional fees. Users have the ability to choose not to compete in any or all of the groups they have been invited to.

There are two classes of Groups: System Generated Groups (e.g. Service Provider Groups) and User Generated Groups. System Generated Groups are generated by the service administrator based on database information about the user. Examples include Intermediate Skill Level and California Bay Area San Francisco 49ers Fans. User Generated Groups are defined by one or more members. A member is able to generate a group either from the services website or from a cellular phone interface. To generate a group, a member generates a name for the group or a generic name is assigned, and then the member adds other members to the group. The member is able to add other members to the group by their handle (unique identifier), email address (for new members) or by their cellular phone number. Groups are able to be assigned to a particular event. A group is able to be designated as an active group or a party. User group owners generate a party by associating the group to a particular event (e.g. Dec. $12^{th}$ Monday Night Football Game). In some embodiments, an email invitation or text message is sent to inform the members of the group that they have been invited to a party.

The game control server maintains a list of groups. Service Provider Groups are automatically assigned to events. User Groups are assigned to events by the group owners. In both cases, a list of active groups is known before the start of the event such as parties for a particular event. Within each of these known groups a list of all the participants is also maintained. This is able to be implemented in several ways. The most common way is via a database manager. This is able to be done through a data structure that is loaded for each event, and a database is one natural implementation to keep track of the group/participant relationships.

Throughout the game, a server manages the scores for every player. The scores are updated in a central location such as a database server, and are sorted with the members of a particular group to identify the rankings for each member in the competition.

During an event, scores and rankings are sent to members of the various groups. This is done after each scoring opportunity, or at a slower pace such as every five minutes or every five scoring opportunities. For small groups (e.g. 20 or less active participants) all of the scores and rankings are able to be sent by the server and displayed on the participant's device. For very large groups there are two approaches that can be taken: 1) Common message or 2) Individualized message. Sending a common message for large groups is much more efficient on the network, and is able to still provide a significant amount of information. The message is able to contain the top 20 names and scores for this group as well as the score that is required to be in the top 95%, 90%, 85%, . . . 5%. When the client receives this message, it determines what percentile the user is in by extrapolating its score between the percentile scores that the user is between. In sending an individual message for a large group, the server would still send the top 20 names and scores as well as the exact percentile that this user falls in.

Each separate tournament is managed effectively. A message is sent from the game server to the individual clients associated with each group. For very large groups, this message is able to be identical for all of those that are receiving the message. Past results tracked on the phone and in more detail on the website will track the rankings in each of the different groups associated with an event. A selection of pre-produced audio and visual comments, for example, in the nature of taunts and cheers are able to be selected from a menu and sent to a specific individual or to all competitors in the group.

Games of skill played on the Internet or cellular phones based upon live telecast sporting events or popular game shows are expected to attract a large number of potential competitors. As in all games of skill, there will be a wide variety of experience and talent and many motivations to play. To some, the enjoyment will be competing in open competitions against skilled players to test their medal. For others, it may be just the ability to compete and possibly win against a handful of close friends who share the same passion for the underlying televised event. Others may be more team oriented and derive more enjoyment from participating as a member of the group. The method and systems described herein provide not only the ability for an individual to find a group of competitors and a contest attractive to them, but also allows them to compete in multiple contests simultaneously with the identical performance and with the same investment of time. This increases not only the sense of community, but provides greater opportunities for the satisfaction of beating friends as well as winning prizes.

FIG. 1 illustrates a flowchart of a process of utilizing the present invention. In the step 100, competitive groups are generated related to events. The competitive groups are either system generated or user generated. As described above, a system generated group is generally based on skill level, location or another generic attribute that some users qualify for, while other users do not. A user generated group is selected by a user where participants are added to the group by entering a username, email address, cellular phone number, or another distinguishing identifier. User generated groups typically include groups of friends, co-workers and other groups of people that a user wants to compete with. Any number of system groups and user groups are able to be generated. In addition to determining who is included in the competition, the events being played within the competition are selected. For example, a user is able to set up a Monday Night Football league, wherein every Monday night for the regular season of the NFL, the users within the group compete based on the Monday night game. In some embodiments, the specific games that the users compete in are selected at later dates beyond the initial generation of the group.

In the step 102, users couple to a network (e.g. the Airplay Network) to participate in the generated competitions. In the step 104, the users are informed which competitions are available for participation. For example, an intermediate user couples to the network using his cellular phone and is greeted with a list of competitions available for him to join. The list includes, a free open competition for all intermediate players for a specified game, an individual group competition that his friend invited him to join also for the same specified game, a team competition that his co-workers wanted him to be a part of where it is a season long tournament which includes the same specified game and another system generated competition also for the same game that costs $10 to enter with larger prizes available than the free competition. In the step 106, each user who has coupled to the network joins the groups desired. Continuing with the example above, the user decides to join the free open competition, the friend's competition and the co-worker competition but does not join the $10 competition.

In the step 108, the users then participate in the competitions by sending user selections (e.g. predictions) to a server within the network for monitoring, analyzing and determining results based on the selections. Based on the results, standings for each competition are also determined. Using the example above again, although the user joined three different competitions related to a single game, the user competes exactly the same as if he entered in only one of the competitions, since his input is distributed for the three different competitions.

In the step 110, the results based on the users' selections are stored. The results are stored in a way such that they are easily retrieved for each competition. For example, a storing mechanism such as a database stores the results of Game X for Player A where Player A's score is 1000. In the free open competition, Player A's score was not good enough to win a prize. However, in the friendly competition, it was the highest score, and in the co-worker team competition it was a score usable by the team. Therefore, although the score was not a winning score for one competition, it was a beneficial score in the other two competitions. By competing in multiple competitions for the same game/event, a user's results/score could provide different outcomes depending on the competition. Therefore, the proper associations of each competition and the score are required.

In the step 112, each user receives the results and/or standings on his cellular phone or computer. The results and/or standings arrive at varying times depending on the setup of the system. The results and/or standings are received or at least accessible after the competition ends. If desired, the results and/or standings are also received throughout the competition such as every five minutes or after a certain number of selections are made. The standings from the results determine who wins at the end of the competition. While displayed during the game, the standings show what position the user is in. The standings are based on the results of the selections made by the users.

Figure 2:
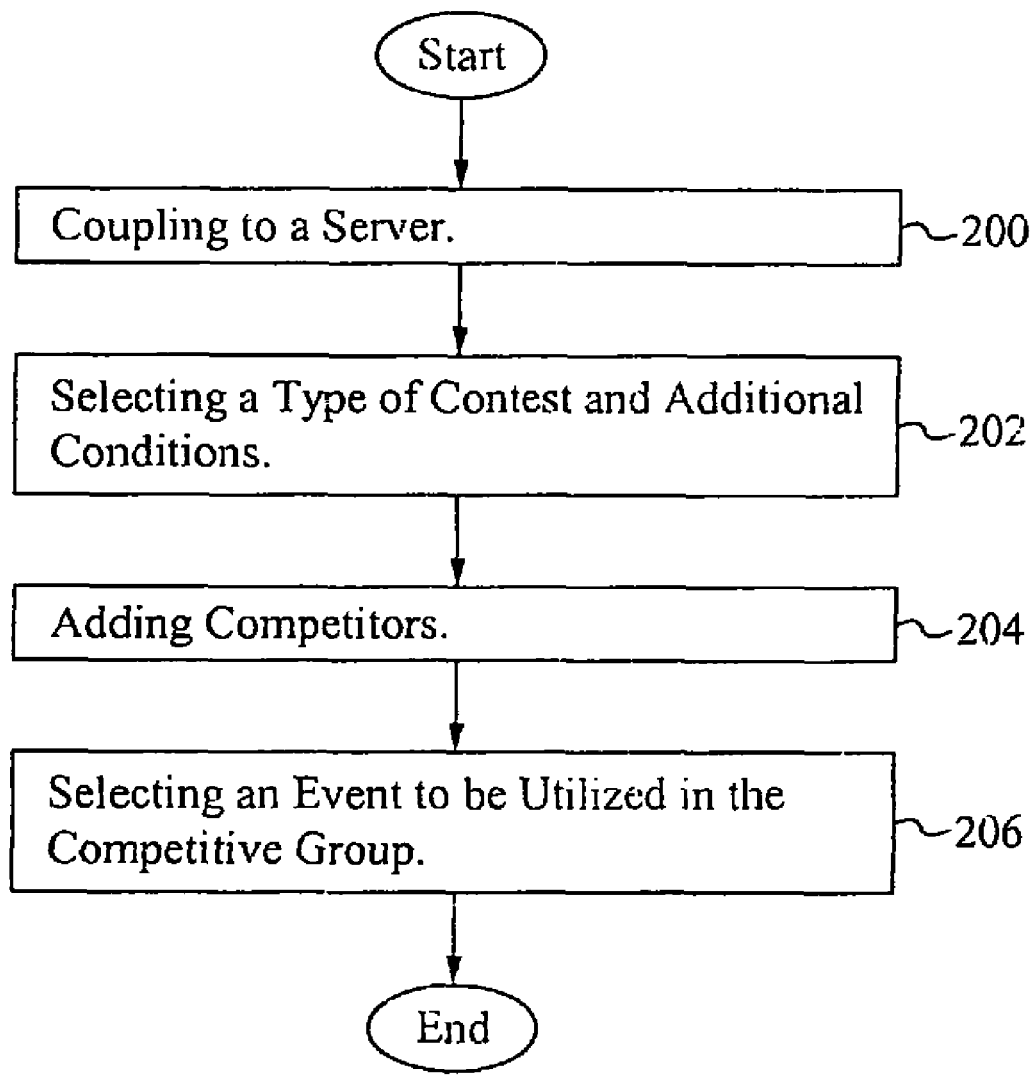
FIG. 2 illustrates a flowchart of a process of generating a user generated competition group.

FIG. 2 illustrates a flowchart of a process of generating a user generated competition group. In the step 200, a user couples to a server within a network (e.g. the Airplay Network) storing an application to generate a competition group. In some embodiments, the application is stored on the user's cellular phone instead of or in addition to on the server. Preferably, the application provides a graphical user interface such as an interactive website for easily generating the competition group. In the step 202, the user selects the type of competition, such as open, head-to-head or team, in addition to other types of competitions. The user also adds any additional requirements or conditions such as intermediate players only or $2 entry fee with the winner-take-all. Additionally, the user labels or names the competition group. In the step 204, competitors are added to the competition. The competitors are added based on a username, phone number, email address or another identification mechanism. In the step 206, either at the initial set up of the competition group or later on, one or more events are selected to be competed in. For example, if a user wants to set up a competition specifically for Super Bowl XLI, he is able to designate that immediately. Or if a user wants to start a week-long competition related to Jeopardy, he is able to do that as well. The user is also able to retain the same group and modify it to generate a second competition. For example, after the Super Bowl XLI competition ends, the user is able to generate another competition with the same group for the NCAA BCS Bowl Championship Game. Users are able to generate as basic or as complex a competition group as desired. As described above, it is able to be for a single event, a variety of events or an entire season of events. Preferably, a database is utilized to organize the competition groups for easy correlation of data.

Figure 3:
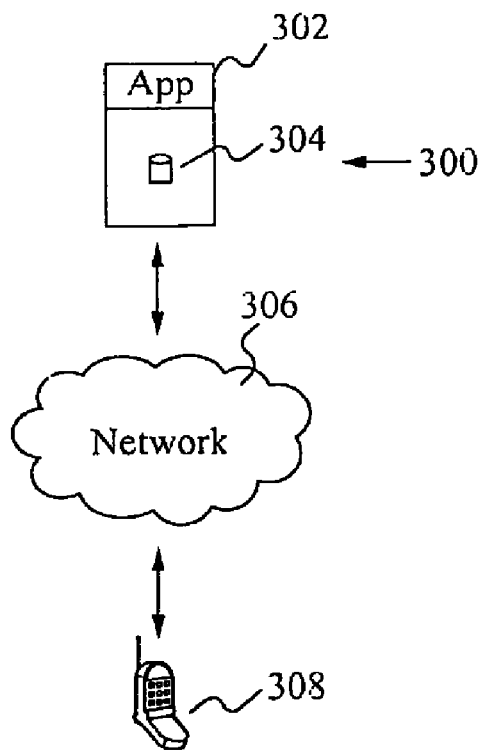
FIG. 3 illustrates a graphical representation of an embodiment of the present invention.

FIG. 3 illustrates a graphical representation of an embodiment of the present invention. A server 300 contains an application 302 and a storage mechanism 304. The application 302 is preferably a web application or at least has a web component to enable users to interact with a web graphical user interface to input data and review data. The storage mechanism 304 is utilized for storing selections and results from the selections as well as competition groups. The storage mechanism 304 preferably includes a database for organizing the data including the selections, results, standings and competition groups amongst other data needed for executing the competitions. The server 300 is part of a network 306. A device 308 couples to the server 300 through the network 306. In some embodiments the network 306 includes the Internet. In some embodiments, the network 306 includes a cellular network Also, in some embodiments, the network 306 includes both the Internet and a cellular network. The device 308 is selected from a cellular phone, a PDA, a computer, a laptop or any other device capable of communicating with the server 300. As described above, in some embodiments, an application for allowing users to generate competition groups, input selections and communicate with the server in general is included in the device 308 instead of or in addition to the application 302 on the server 300.

Figure 4:
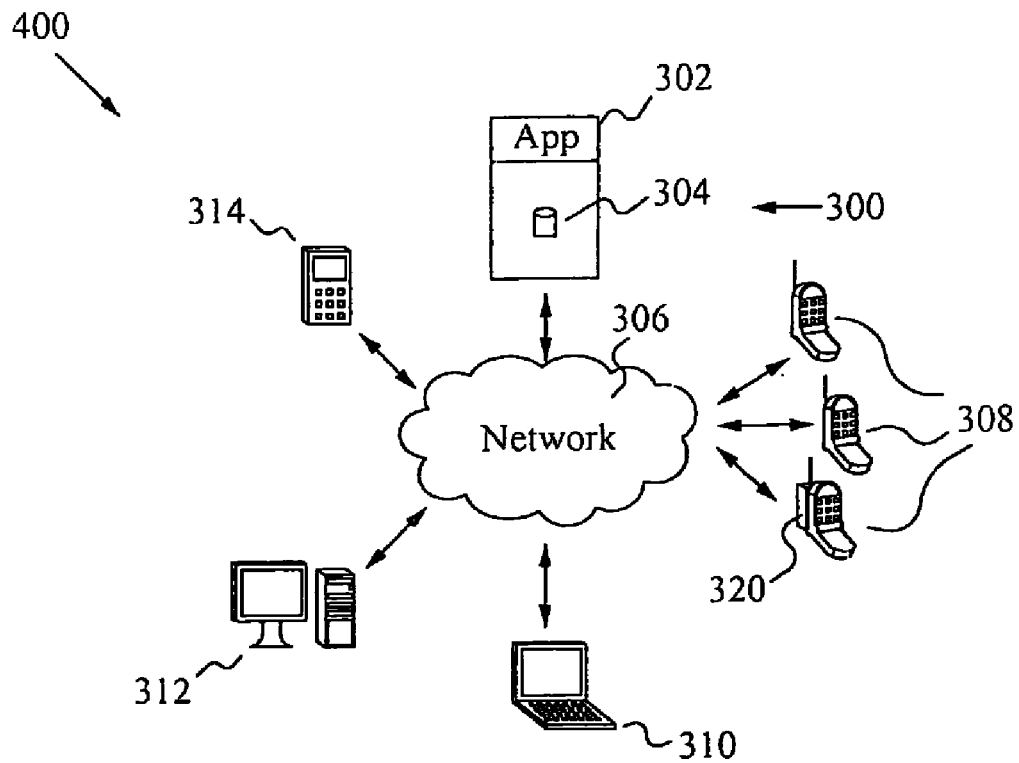
FIG. 4 illustrates a graphical representation of a network of devices.

FIG. 4 illustrates a graphical representation of a network of devices. As described above, the server 300 contains the application 302 and the storage mechanism 304 for inputting and outputting data related to the competitions. The device 308, couples to the network through a network 306. As described above, the network includes either the Internet, a cellular network or both. Although the device 308 is able to be a device other than a cellular phone as shown, other devices are also shown coupled to the network 306 therefore forming a network of devices 400. The other devices include a laptop 310, a computer 312 and a PDA 314. One of the devices 308 is shown with an application 320 for enabling the user to generate competition groups and communicate with the server 300.

In some embodiments, handicaps are implemented so that users of different levels are able to compete more fairly. Handicaps provide additional points to users at lower levels so their score is comparable to a more advanced user. The handicaps are determined based on analysis of the scoring. For example, if advanced users on average score 3000, while intermediate users on average score 2000 and beginners on average score 1000 for the same set of questions, then a fair handicap is 1000 per difference in level. Thus, when there is a friendly competition between one user who is advanced by playing every week and three beginner users who play once a month just for fun, a straight game without handicaps is not likely going to be a close competition. However, if the beginner users are given help to put them on par with the advanced user, then the outcome of the competition could result in a beginner user winning.

In some embodiments, each user competes in the same game, but slightly different sets of questions/choices are posed based on the competition level. For example, an intermediate user chooses to play in an open intermediate competition and also with a group of beginner friends. Each of the beginner users is asked to choose what type of play the following play is going to be (e.g. Run or Pass). The intermediate user is also asked to choose the following play. However, the intermediate user is also asked to choose which direction the play will go (e.g. Left or Right). Therefore, the same game is being played to some extent, but there is a slight modification, so that more advanced users have additional options. However, when scoring, the additional options apply only across the same level. Thus, the user selecting Left or Right correctly has no effect on the scoring in the beginner competition. It only affects scoring for the intermediate competition. Thus, users are able to compete at different levels for the same event.

To utilize the present invention, users select from or generate competition groups to participate in. The users select system generated competition groups which are specific to levels, geographic locations and other general categories. The users are also able to generate their own competition groups which include friends, family, co-workers or other groups of people they choose. After the competition groups are generated, users are able to join whichever group they are invited to. After joining one or more groups, the users are able to join additional groups beyond that as they are generated and become available to the user. A user is informed of the competition groups available for entering either by email, Short Message Service (SMS) text message, voice message or when the user couples to the network to view/play competitions. After joining the desired competition groups, the user participates in the competitions by answering questions or making selections based on viewing a sporting event, television show, game show or other event where skill is involved in making choices. In addition, games of skill with a common start time can be conducted simultaneously in real-time, based on classic card, dice, trivia, word and other games. The selections/answers/predictions are stored and results and/or standings are sent to the user. The results and/or standings throughout the competition show how well the user is doing compared to other competitors via standings, and when the competition is over, the results and/or standings determine who the winner is. Additionally, since multiple competitions are occurring based on a single event, the results and standings are organized so that the user is able to understand how he is doing in each event. For example, if a user is winning by a lot in his two friendly competitions, but is slightly out of prize position in the open competition, he will not simply relax and coast to victory in his friendly competitions. He is able to realize that by performing slightly better, he still has a chance to win a prize in the open competition, while still winning easily in the friendly competitions.

In operation, the present invention allows users to set up and compete in multiple competitions for a single event. Although users are competing against typically different competitors in different competition groups, the same selections are utilized to produce scores that have specific meaning based on the competition group. As described above, a user may lose in one competition group but win in another competition group because the competitors are different. Also, the requirements of each group are different as well. For example, in team play, if the top two scores are counted and the user has one of the top two scores, then his score is important even though he lost in a different competition group. In another example, the competition group is a season long event where there is no weekly winner, but only a year-end winner. Thus, although the competitor is doing terrible one week and has no chance of winning the separate weekly competition, the user is still encouraged to do as well as possible for the year-end total. By allowing users to compete in multiple competition groups for the same event, the user interaction increases substantially. For example, instead of a user simply playing his standard weekly intermediate football competition, the user is also invited to play in his family's tournament for bragging rights, his friend's competition where the winner gets $20 and his co-worker's competition where the lowest score pays for a round of drinks the following Friday. With more chances to win, users have a much more vested interest in competing. To ensure users do not get frustrated with the scoring, the results and/or standings are displayed in a very user-friendly format so that a user knows how well he is doing in each respective competition.

In some embodiments, multiple servers are used within the network. For example, one server is dedicated for the scoring, a separate server is dedicated for the database and another server is dedicated for hosting the graphical user interface.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of participating in multiple contests of skill each comprising a plurality of competitors and corresponding to a common event comprising:
   a. receiving a list of competitive groups to join on a memory device;
   b. selecting a plurality of competitive groups to join;
   c. participating with the plurality of competitive groups by sending selections related to the common event from the memory device to a server, wherein the common event comprises a common set of game elements revealed simultaneously to all competitors; and
   d. receiving standings on the memory device from the server periodically and during participating with the plurality of competitive groups, wherein the standings are based on results from the selections, are separated based on the plurality of competitive groups and represent relative performance in the separate competitive groups.

2. The method as claimed in claim 1 wherein the event is selected from the group consisting of a television-based sporting event, an entertainment show and a game show.

3. The method as claimed in claim 1 wherein the event comprises classic card, dice, trivia and word games played simultaneously.

4. The method as claimed in claim 1 wherein the competitive groups are selected from the group consisting of service provider generated competitive groups and user generated competitive groups.

5. The method as claimed in claim 4 wherein the service provider generated competitive groups are based on general playing characteristics.

6. The method as claimed in claim 1 wherein the list of competitive groups to join is received on the device selected from the group consisting of a cellular phone, a laptop computer, a personal computer and a PDA.

7. The method as claimed in claim 1 wherein the competitive groups are maintained in a database.

8. The method as claimed in claim 1 wherein the results include a handicap.

9. A method of conducting multiple contests of skill each comprising a plurality of competitors, wherein the multiple contests correspond to a common event, the method comprising:
   a. generating separate competitive groups related to the event;
   b. coupling to a network with a memory device to participate in the competitive groups;
   c. informing a user which of the competitive groups are available for the user to join;
   d. joining a selected number of the competitive groups;
   e. participating with the competitive groups by sending selections related to the common event from the memory device to a server within the network, wherein the common event comprises a common set of game elements revealed simultaneously to all competitors;
   f. storing results and standings on the server, wherein the standings are based on the results and the results are based on the selections and further wherein the standings are separated based on the plurality of competitive groups and represent performance in the competitive groups; and
   g. transmitting the standings to the memory device periodically and during participating with the competitive groups.

10. The method as claimed in claim 9 further comprising displaying the standings on the device.

11. The method as claimed in claim 9 wherein the server contains an application and a database for assisting in generating the competitive group.

12. The method as claimed in claim 11 wherein the application includes a graphical user interface.

13. The method as claimed in claim 9 wherein the device contains an application for assisting in generating the competitive group.

14. The method as claimed in claim 9 wherein generating competitive groups related to the event further comprises:
   a. coupling to the server;
   b. selecting a type of contest and additional conditions to be included in the competitive group;
   c. adding competitors to the competitive group; and
   d. selecting the event for competition by the competitive group.

15. The method as claimed in claim 14 wherein the type of contest is selected from the group consisting of an open contest, a head-to-head contest and a team contest.

16. The method as claimed in claim 14 wherein adding competitors to the competitive group includes identifying the competitors by an identifier selected from the group consisting of a username, an email address, a cellular phone number and a personal identifier.

17. The method as claimed in claim 14 further comprising sending an invitation which informs the competitors of an opportunity to be included in the competitive group.

18. The method as claimed in claim 17 wherein the invitation is sent by a mechanism selected from the group consisting of an email, an SMS text message and a voice message.

19. The method as claimed in claim 9 wherein the event is selected from the group consisting of a television-based sporting event, an entertainment show and a game show.

20. The method as claimed in claim 9 wherein the event comprises classic card, dice, trivia and word games played simultaneously.

21. The method as claimed in claim 9 wherein the competitive groups are selected from the group consisting of service provider generated competitive groups and user generated competitive groups.

22. The method as claimed in claim 21 wherein the service provider generated competitive groups are based on general playing characteristics.

23. The method as claimed in claim 9 wherein the device is selected from the group consisting of a cellular phone, a laptop computer, a personal computer and a PDA.

24. The method as claimed in claim 9 wherein the competitive groups are maintained in a database.

25. The method as claimed in claim 9 wherein the results include a handicap.

26. A system for conducting multiple contests of skill each comprising a plurality of competitors and corresponding to a common event comprising:
   a. a device; and
   b. a server coupled to the device through a network for:
      i. storing competitive groups;
      ii. receiving selections related to the common event, wherein the common event comprises a common set of game elements revealed simultaneously to all competitors;
      iii. storing results and standings based on the selections, wherein the standings are based on the results, are separated based on the competitive groups and represent performance in the competitive groups; and
      iv. transmitting the standings to the device periodically and during participation of the common event.

27. The system as claimed in claim 26 wherein the server is further for providing an interface for generating competitive groups related to the event.

28. The system as claimed in claim 26 wherein the device contains an application for generating the competitive groups related to the event.

29. The system as claimed in claim 26 wherein the event is selected from the group consisting of a television-based sporting event, an entertainment show and a game show.

30. The system as claimed in claim 26 wherein the event comprises classic card, dice, trivia and word games played simultaneously.

31. The system as claimed in claim 26 wherein the device communicates data for generating the competitive groups, for selecting the competitive groups to join and for submitting the selections.

32. The system as claimed in claim 26 wherein the network includes at least one of the Internet and a cellular network.

33. The system as claimed in claim 26 wherein the network identifies the competitive groups a user is eligible for.

34. The system as claimed in claim 26 further comprising a database stored on the server for managing the selections, the results, the standings and the competitive groups.

35. The system as claimed in claim 26 wherein the device is selected from the group consisting of a cellular phone, a laptop computer, a personal computer and a PDA.

36. The system as claimed in claim 26 wherein the results include a handicap.

37. A network of devices for conducting multiple contests of skill each comprising a plurality of competitors and corresponding to a common event comprising:
   a. a plurality of devices; and
   b. a server within a network, wherein the server and the plurality of devices communicate to conduct the multiple contests of skill corresponding to the common event, the server for:
      i. storing competitive groups;
      ii. receiving selections related to the common event, wherein the common event comprises a common set of game elements revealed simultaneously to all competitors;
      iii. storing results and standings based on the selections, wherein the standings are based on the results, are separated based on the competitive groups and represent performance in the competitive groups; and
      iv. transmitting the standings to the device periodically and during participation of the common event.

38. The network of devices as claimed in claim 37 wherein the plurality of devices are selected from the group consisting of cellular phones, laptop computers, personal computers and PDAs.

39. A server device for conducting multiple contests of skill each comprising a plurality of competitors and corresponding to a common event comprising:
   a. a storage mechanism; and
   b. an application for interacting with the storage mechanism and a communicating device to generate and store competitive groups which are used to compete in the multiple contests of skill for:
      i. receiving selections related to the common event, wherein the common event comprises a common set of game elements revealed simultaneously to all competitors;
      ii. storing results and standings based on the selections, wherein the standings are based on the results, are separated based on the competitive groups and represent performance in the competitive groups; and
      iii. transmitting the standings to the device periodically and during participation of the common event.

40. The server device as claimed in claim 39 wherein the storage mechanism is a database.

41. The server device as claimed in claim 39 wherein the communicating device is selected from the group consisting of a cellular phone, a laptop computer, a personal computer and a PDA.

42. The server device as claimed in claim 39 wherein interacting with the storage mechanism and the communicating device further includes receiving selections and transmitting standings.

43. A device for participating in multiple contests of skill each comprising a plurality of competitors and corresponding to a common event comprising:
   a. a communications module for coupling to a server, the server for;
      i. storing competitive groups;
      ii. receiving selections related to the common event, wherein the common event comprises a common set of game elements revealed simultaneously to all competitors;
      iii. storing results and standings based on the selections, wherein the standings are based on the results, are separated based on the competitive groups and represent performance in the competitive groups; and
      iv. transmitting the standings to the device periodically and during participation of the common event; and
   b. an application for utilizing the communications module for coupling to a server to communicate with the server to generate competitive groups which are used to compete in the multiple contests of skill.

44. The device as claimed in claim 43 wherein the application utilizes the communications module for coupling to the server to send selections to and receive standings from the server.

\* \* \* \* \*

UNITED STATES PATENT AND TRADEMARK OFFICE
CERTIFICATE OF CORRECTION

| | | |
|---|---|---|
| PATENT NO. | : 8,002,618 B1 | |
| APPLICATION NO. | : 11/652240 | |
| DATED | : August 23, 2011 | |
| INVENTOR(S) | : David B. Lockton et al. | |

It is certified that error appears in the above-identified patent and that said Letters Patent is hereby corrected as shown below:

Title Page

In the Specification

In the References Cited (56), please add the following references:

4,270,755 to Willhide
5,566,291 to Boulton

Please replace the reference JP 1-46356 with the reference JP 11-46356.

Signed and Sealed this
Eighth Day of November, 2011

David J. Kappos
*Director of the United States Patent and Trademark Office*